(12) United States Patent
Potts

(10) Patent No.: US 12,370,478 B2
(45) Date of Patent: Jul. 29, 2025

(54) FILTER MEDIA, FILTER AND FILTRATION MACHINE

(71) Applicant: Excel Corporate Holdings Limited, Walsall (GB)

(72) Inventor: Richard Potts, Walsall (GB)

(73) Assignee: Excel Corporate Holdings Limited, Walsall (GB)

( * ) Notice: Subject to any disclaimer, the term of this patent is extended or adjusted under 35 U.S.C. 154(b) by 437 days.

(21) Appl. No.: 17/999,471

(22) PCT Filed: Jun. 8, 2021

(86) PCT No.: PCT/GB2021/051412
§ 371 (c)(1),
(2) Date: Nov. 21, 2022

(87) PCT Pub. No.: WO2021/250388
PCT Pub. Date: Dec. 16, 2021

(65) Prior Publication Data
US 2023/0226472 A1      Jul. 20, 2023

(30) Foreign Application Priority Data

Jun. 10, 2020 (GB) .................................. 2008815

(51) Int. Cl.
*B01D 39/06* (2006.01)
*B01D 17/04* (2006.01)
(Continued)

(52) U.S. Cl.
CPC .......... *B01D 39/06* (2013.01); *B01D 17/045* (2013.01); *B01D 39/04* (2013.01); *C02F 1/40* (2013.01);
(Continued)

(58) Field of Classification Search
CPC .............................. B01D 39/06; B01D 39/04; B01D 2239/0407; B01D 2239/0428; B01D 2239/0645; B01D 2239/065; B01D 2239/1233; B01D 2239/1266; B01D 24/00; B01D 17/045; C02F 1/40
See application file for complete search history.

(56) References Cited

U.S. PATENT DOCUMENTS 9,352,267 B2 * 5/2016 Krupnikov ............. B01D 39/18
2003/0047511 A1 3/2003 Burton et al.
(Continued)

FOREIGN PATENT DOCUMENTS

GB   2475737 A     6/2011
WO   2011064561 A1 6/2011
WO   2011121264 A1 10/2011

OTHER PUBLICATIONS

International Search Report and Written Opinion from Priority Patent Application PCT/GB2021/051412 (9 Pages) Sep. 7, 2021.
(Continued)

*Primary Examiner* — Liam Royce
(74) *Attorney, Agent, or Firm* — Calderone McKay, LLC

(57) ABSTRACT

The present invention relates to a filter media for filtering condensate which includes oily contaminant. The present invention also relates to a filter comprising the filter media. The present invention also relates to a filtration machine comprising the filter media.

18 Claims, 4 Drawing Sheets

(51) Int. Cl.
    *B01D 39/04* (2006.01)
    *C02F 1/40* (2023.01)
(52) U.S. Cl.
    CPC ............... *B01D 2239/0407* (2013.01); *B01D 2239/0428* (2013.01); *B01D 2239/0645* (2013.01); *B01D 2239/065* (2013.01); *B01D 2239/1233* (2013.01); *B01D 2239/1266* (2013.01)

(56) References Cited

U.S. PATENT DOCUMENTS

2012/0267311 A1* 10/2012 Timmins ................ B01D 39/06
                                                    210/252
2016/0263509 A1* 9/2016 De Wolf .............. B01D 17/045
2017/0106129 A1* 4/2017 Sutton ................ B01D 39/2037

OTHER PUBLICATIONS

UKIPO Search Report from Priority Patent Application GB2008815.9 (1 Page) Dec. 1, 2020.

* cited by examiner

FILTER MEDIA, FILTER AND FILTRATION MACHINE

CROSS-REFERENCE TO RELATED APPLICATIONS

This application is a U.S. national phase entry patent application under 35 U.S.C. 0371 and claims priority under 35 U.S.C. § 363 to International PCT Patent Application No. PCT/GB2021/051412, which designates the United States and claims priority under 35 U.S.C. §§ 119(a)-(d) to United Kingdom Patent Application No. 2008815.9, the entire disclosures of which are incorporated by reference herein.

BACKGROUND OF THE INVENTION

Field of the Invention

This invention relates to filter media and more particularly but not exclusively to filter media for filtering condensate from an air compressor. This invention also relates to a filtration machine and more particularly but not exclusively to a filtration machine for filtering condensate from an air compressor. Such condensate typically is predominantly water, with some entrained impurities, including oil.

Description of Related Art

It is known to remove the oil from condensate using filter media, typically by filtering the condensate though activated Carbon media. This removes the oil, but is relatively expensive. Carbon media can quickly become contaminated where the condensate contains larger amounts of oil.

U.S. Pat. No. 4,753,730 described the use of oleophillic fibres of polypropylene as a filter media. Although the use of fine fibres such as those suggested in U.S. Pat. No. 4,753,730 maximises the available surface area for contacting the condensate to be filtered, a problem with such fine fibres is that they matt when subjected to heavy fluid flows or when immersed in the condensate to be filtered (or the filtrate). Such matted fibres reduce the liquid flow through the filter media. Accordingly, such filter media cannot be densely packed into a filter housing as this aggravates the restricting of liquid flow. In U.S. Pat. No. 4,753,730, matted fibres are cut into strands in an effort to improve liquid flow through the media.

After prolonged use of such filter media in this form, even if immersed in the liquid to be filtered, much of the matted fine fibres will tend to remain dry and uncontacted by the liquid as the liquid to be filtered flows though flow paths of least resistance in the matted fibres.

To improve filtering efficiency and aid fluid flow it is desirable to wet the fine fibre media. However, typical wetting agents if used in conjunction with polypropylene fibres, have a deleterious effect, as detergent or another surfactant for example reduces the polypropylene's ability to discriminate between, for example, oil and water, with the effect that the media adsorbs both oil and water thus reducing filtering efficiency.

WO 2011/064561 A1 described that using a mass of oleophillic silica-based fibres provides efficient filtering of condensate.

WO 2011/064561 A1 described that oleophilic silica-based fibres, and particularly but not exclusively glass fibres, are efficient at filtering oily contaminant from water. Such fibres can be wetted with a detergent or other surfactant for example further to improve filtering efficiency and to aid flow though the filter media, or at least passage of the filtrate, without the silica-based fibres losing their ability to discriminate between oily contaminant and water.

Accordingly, more oily contaminant is adsorbed or absorbed, whilst more water in the condensate is permitted to flow through the media.

Because the wetted silica-based fibres are so much more efficient at filtering than for example polypropylene, it is possible to pack the silica-based fibres to a higher density in the exterior housing.

WO 2011/064561 A1 described a filter media comprising silica-based fibres and, supported within the mass of the fibres, an anti-packing material, such as particles of Perlite. Whereas such anti-packing material may take no active part in filtering the condensate (the Perlite does not adsorb or absorb any significant quantity of oily contaminant, if any) such material may assist further in preventing the fibres in the filter packing such as to obstruct the flow of liquid through the filter, by mechanically separating the fibres and maintaining this separation in use.

BRIEF SUMMARY OF THE INVENTION

The present invention seeks to provide an improved filter media.

According to a first aspect of the present invention, there is provided a filter media for filtering condensate which includes water and oily contaminant, the filter media comprising:
  silica-based oleophilic fibres, and,
  an anti-packing material, wherein the anti-packing material is polystyrene beads at from 0.5% by weight to 5.0% by weight.
Preferably, wherein the polystyrene beads are present at from 1.0% by weight to 3.0% by weight.
Further preferably, wherein the silica-based oleophilic fibres are glass wool fibres and/or silicate fibres and/or sodium silicate fibres.
Advantageously, wherein: the polystyrene beads are entangled in the fibres; or, the polystyrene beads are in one, two, three, four or five separate layers, between two, three, four, five or six separate layers of the fibres.
Preferably, wherein the polystyrene beads are spherical and have a diameter of from 1 mm to 10 mm.
Further preferably, wherein the polystyrene beads have a diameter of from 3 mm to 5 mm.
Advantageously, wherein the silica-based oleophilic fibres are silicate fibres and/or sodium silicate fibres with a diameter of from 1 to 10 μm.
Preferably, wherein the silicate fibres and/or sodium silicate fibres have a diameter of from 2 to 5 μm.
Further preferably, wherein the filter media has a packed density of from 100 to 220 g/l.
Advantageously, wherein the filter media has a packed density of: from 150 to 210 g/l; or, from 170 to 200 g/l.
Preferably, wherein the filter media further comprises one, two, three or all of: Polypropylene fibres; Perlite; Water; and/or, Glycerine.
Further preferably, wherein the filter media comprises:
  silica-based oleophilic fibres (optionally, glass wool fibres and/or silicate fibres and/or sodium silicate fibres) at from 70% by weight to 80% by weight, and polystyrene beads at from 0.5% by weight to 5.0% by weight, the balance being one, two or three of polypropylene fibres, water and/or glycerine.

Advantageously, wherein the filter media comprises:
silica-based oleophilic fibres (optionally, glass wool fibres and/or silicate fibres and/or sodium silicate fibres) at from 70% by weight to 80% by weight,
polystyrene beads at from 0.5% by weight to 5.0% by weight,
polypropylene fibres at from 2.0% by weight to 4.0% by weight,
water at from 1.0% by weight to 20.5% by weight, and,
glycerine at from 7.0% by weight to 10.0% by weight;
optionally, the filter media further comprising unavoidable impurities.

Preferably, wherein the filter media comprises:
silica-based oleophilic fibres (optionally, glass wool fibres and/or silicate fibres and/or sodium silicate fibres) at from 73% by weight to 78% by weight,
polystyrene beads at from 1.0% by weight to 3.0% by weight,
polypropylene fibres at from 2.0% by weight to 3.0% by weight,
water at from 7.0% by weight to 16.0% by weight, and,
glycerine at from 8.0% by weight to 9.0% by weight;
optionally, the filter media further comprising unavoidable impurities.

According to another aspect of the present invention, there is provided a filter comprising the filter media described above.

According to another aspect of the present invention, there is provided a filtration machine comprising the filter media of described above, or, the filter described above.

According to another aspect of the present invention, there is provided a method of removing oil from a condensate which includes water and oily contaminant, the method comprising: passing the condensate through the filter media described above; or, a filter described above; or, a filtration machine described above.

Preferably, wherein the condensate comprises water and oil, the oil present in the condensate at: from 20 ppm to 2,000 ppm; or, from 50 ppm to 1,000 ppm; or, from 100 ppm to 500 ppm; or, from 150 ppm to 250 ppm.

BRIEF DESCRIPTION OF THE SEVERAL VIEWS OF THE DRAWINGS

Examples of the invention are described below with reference to the accompanying figures. The accompanying figures illustrate various examples of systems, methods, and examples of various other aspects of the disclosure. A person of ordinary skill in the art will appreciate that the illustrated element boundaries (for example boxes, groups of boxes, or other shapes) in the figures represent one example of the boundaries. It may be that in some examples one element is designed as multiple elements or that multiple elements are designed as one element. In some examples, an element shown as an internal component of one element may be implemented as an external component in another and vice versa. Furthermore, elements may not be drawn to scale. Non-limiting and non-exhaustive descriptions are described with reference to the following figures. The components in the figures are not necessarily to scale, emphasis instead being placed upon illustrating principles.

DETAILED DESCRIPTION OF THE INVENTION

Figure 1:
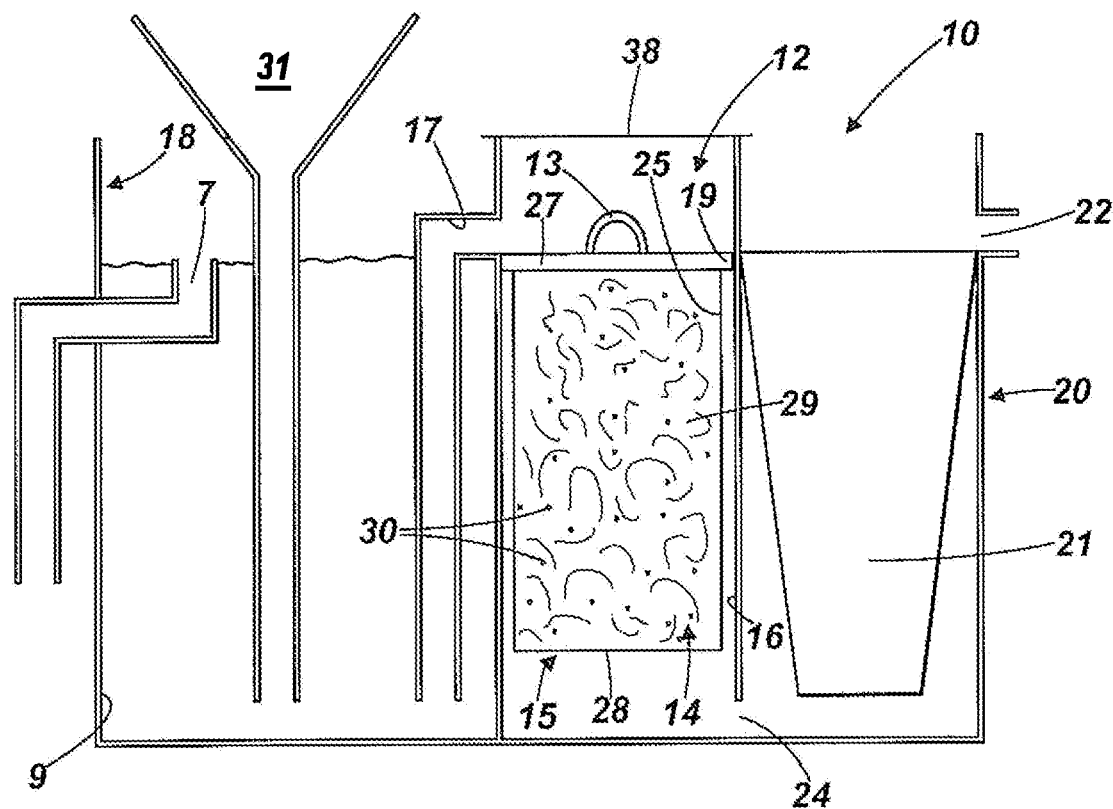
FIG. 1 is an illustrative view of a filtration machine in accordance with one aspect of the invention.

Some examples of this disclosure will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of examples of the present disclosure, the preferred systems and methods are now described.

Examples of the present disclosure will be described more fully hereinafter with reference to the accompanying figures in which like numerals represent like elements throughout the figures, and in which example examples are shown. Examples of the claims may, however, be embodied in many different forms and should not be construed as limited to the examples set forth herein. The examples set forth herein are non-limiting examples and are merely examples among other possible examples.

Definitions

Some of the terms used to describe the present invention are set out below:

"Silica-based oleophilic fibres" refers to fibres containing silica which adsorb and/or absorb oil. Silica-based oleophilic fibres may be silicate fibres (sometimes referred to as glass wool fibres and/or sodium silicate fibres) with a diameter of: from 1 to 10 µm; or, from 2 to 5 µm. Silica-based oleophilic fibres may be a plurality of silicate fibres with a pack density of: from 100 to 220 g/l; or, from 150 to 210 g/l; or, from 170 to 200 g/l. A non-limiting example of silica-based oleophilic fibres is SUPAFIL 40 glass blowing mineral wool as sold by Knauf Insulation (EU index number 650-016-00-2).

"Fibre" or "fibres" refers to a natural or a synthetic substance that is significantly longer than it is wide (for example, with an aspect ratio (a ratio of fibre length to diameter) of from 20 to 400; or from 20 to 60; or, from 60 to 400). For example, fibre refers to a thread or a filament from which a textile or material is formed.

"Anti-packing material" refers to a material present in filter media which acts to prevent fibres packing so as to obstruct the flow of liquid through the filter media.

"Polystyrene beads" refers to generally spherical beads formed of polystyrene. Such beads are of the sort used as a filling for bean bags. The polystyrene beads used in the present invention can have a diameter of: from 1 mm to 10 mm; or, from 1.5 mm to 7.5 mm; or, from 2 mm to 6 mm; or, from 3 mm to 5 mm. A non-limiting example of polystyrene beads are the expanded polystyrene beads sold by Springvale EPS Limited having a diameter of from 3 mm to 5 mm.

"Perlite" refers to an amorphous volcanic glass typically formed by the hydration of obsidian. Perlite is used in horticulture (as an additive and solid improver), as a light-weight filler (in ceiling tiles and gypsum boards), as a filter aid in the food industry and as a spillage absorbent. A non-limiting example of Perlite is the expanded Perlite sold by RS Minerals Ltd.

"Glycerine" refers to the compound 1,2,3-propanetriol (CAS number 56-81-5). Glycerine is a colourless, odourless and viscous liquid. A non-limiting example of glycerine is the glycerine sold by Monarch Chemical Ltd.

"% by weight" refers to the mass fraction, i.e. the mass of a substance present in a mixture as a percentage of the total mass of the mixture.

"Condensate" refers to waste from an industrial process which is predominantly water, with some entrained impurities, including oil. A common form of condensate is output from an air compressor during use. Such condensate cannot be safely disposed of without removing the entrained oil.

"Unavoidable impurities" refers to components present in a mixture which are generally inert and have no effect on the rest of the mixture. Unavoidable impurities are present in a mixture at: less than 2% by weight; or, less than 1% by weight; or, less than 0.5% by weight; or, less than 0.1% by weight.

Examples

Figures 2, 3, 4:
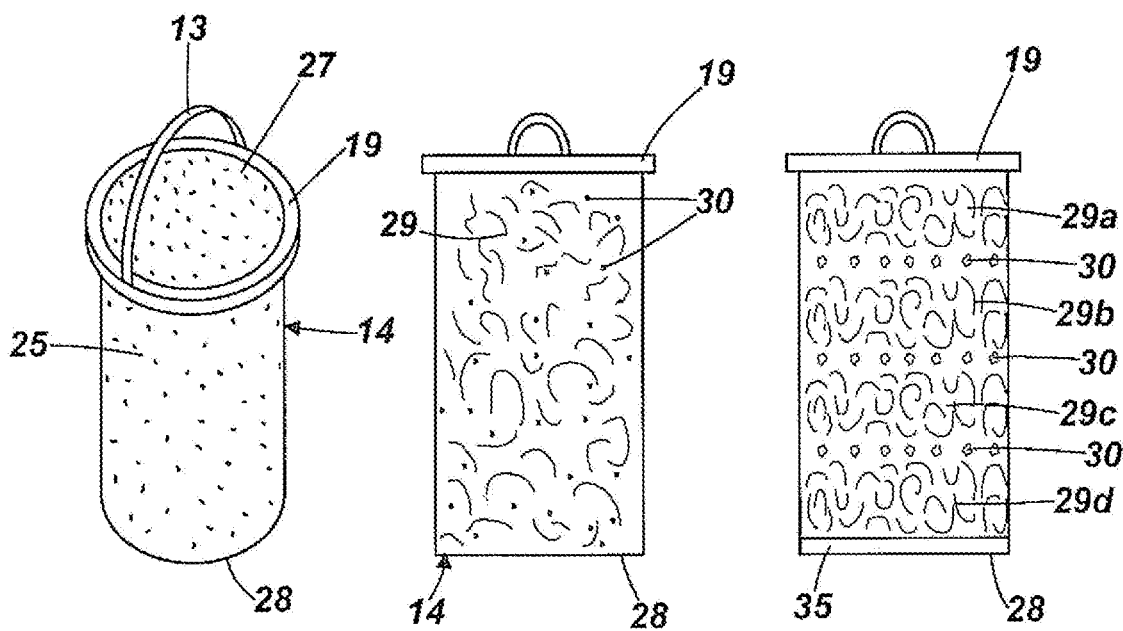
FIG. 2 is a perspective illustrative view of the filter of the machine of FIG. 1.
FIG. 3 is an illustrative sectional side view of the filter of FIG. 2.
FIG. 4 is a view similar to that of FIG. 3 but of an alternative example.

Filtration Machine of FIGS. 1, 2 and 3

Referring to FIGS. 1, 2 and 3 of the figures, a filtration machine 10 has a main filter chamber 12 in which a filter 14 is provided. The filter 14 comprises filter media. The main filter chamber 12 is substantially cylindrical, and the filter 14 is of a corresponding configuration but the filter chamber 12 and/or the filter 14 could be of another configuration as required. The filter 14 includes an external housing 15, and at one axial end, i.e. the upper end of the filter 14, the filter 14 includes an external seal 19 which when the filter 14 is received in the chamber 12, provides a seal with an internal wall 16 of the main filter chamber 12.

The filtration machine 10 further includes an inlet 17 to the main filter chamber 12 through which condensate to be filtered enters the chamber 12 at a position located above the filter 14 in this example.

The inlet 17 in this example receives condensate from beneath a weir device 18. Condensate from one or more air compressors (or cooling plants etc.) with entrained oily contaminant is collected in an ante-chamber 9 of the weir device 18 to which it flows through a machine inlet 31. As the liquid collects in the ante-chamber 9, there will be some separation between the water component of the condensate and the oily contaminant, although some water will remain emulsified with the oily contaminant. When the liquid level in the ante-chamber 9 rises to that of an outlet weir 7, lighter floating oily contaminant (and such contaminant emulsified with water) will pass over the weir 7 and pass to a collector (not shown) for disposal.

Condensate which does not pass from the weir device 18 over the weir 7, i.e. which is the predominantly water faction, passes from a lower region of the ante-chamber 9 to the inlet 17 to the main filter chamber 12, which is at the same height as the weir 7.

Condensate which enters the main filter chamber 12 via the inlet 17 is constrained to pass through the filter 14 where it is filtered, and then to a main filter chamber outlet 24 below the filter 14 in this example. The filtrate then passes in this example into the secondary filter chamber 20, flows through a Carbon filter 21, and from the Carbon filter 21 to a machine discharge outlet 22 which in this example, is at the same level as the weir 7, but could be at a lower level.

By filtering the condensate in both of the main filter chamber 12 and the secondary filter chamber 20 if required, the filtrate which is discharged at 22 is substantially cleansed of oily contaminant, and the object is for it to be sufficiently clean that the filtrate can be discharged safely to the environment.

The exterior housing 15 of the filter 14 in the main filter chamber 12 defines internally, a filter interior. The housing 15 in this example has either a cloth, woven, non-woven or the like generally flexible cylindrical side wall 25, and substantially rigid upper and low end walls 27, 28 respectively. The upper and lower end walls 27, 28 have openings provided by perforations (or the openings may be integrally formed with the upper and/or lower end walls 27, 28), and the flexible side wall 25 is provided with openings by perforating by needle punching for example during manufacture of the cloth. In another example an alternative part/the entire exterior housing 15 may be rigid, semi-rigid or flexible, or the side wall 25 may be rigid and one or both of the end walls 27, 28 flexible. In each case, the openings in the exterior housing 15 in at least the upper end wall 27, provide passages through which condensate may pass into the filter interior, and the openings in the side wall 25 and the lower end wall 28 provide passages through which filtered liquid can pass back out of the filter interior.

Depending on where and how the seal 19 is provided, if at all, the condensate entering the main filter chamber 12 is separated from the filtrate, and so different openings to those identified may allow for the passage of condensate/filtrate in to and back out of the filter interior. For example, if the seal 19 was provided axially part-way along the side wall, 25, the openings in the side wall 25 above the seal would allow condensate to pass into the filter interior, and openings in the side wall 25 below the seal would permit the filtrate to pass back out of the filter interior.

Within the filter 14 interior there is provided filter media, which according to the invention includes a mass of silica-based oleophillic fibres 29.

In the examples shown in the figures, the silica-based oleophillic fibres 29 are short glass fibres, for example the fibres are predominantly 20 mm or less in length. The silica-based oleophillic fibres are fine, having a diameter in the range of from 1 to 10 µm; or, from 2 to 5 µm; or, from 5.0 µm to 10 µm; or, from 5.0 µm to 8 µm; or, from 5.0 µm to 5.5 µm, as required. The silica-based oleophilic fibres may be a plurality of silicate fibres with a pack density of: from 100 to 220 g/l; or, from 150 to 210 g/l; or, from 170 to 200 g/l. Such fibres when massed (for example pressed together) provide a glass wool.

The fibres of the silica-based oleophillic fibres 29 (for example glass wool) exhibit a particular affinity for oil, and thus as the condensate contacts, for example passes though, the filter media, predominantly the oily contaminant is adsorbed and/or absorbed by the silica-based oleophillic fibres 29, and the water component is allowed to pass.

Using such short silica-based fibres of this diameter, particularly efficient filtering of the condensate can be achieved as the silica-based oleophillic fibres 29 collectively present a large surface area to the condensate. However, instead of glass wool, any other silica-based fibres which exhibit oleophillic properties may be massed, but silica-based fibres provided as a wool provides a particularly effective solution, and economically.

To improve filtering efficiency, the glass wool fibres may be pre-treated with a wetting agent such as a detergent or other surfactant, which it has been found improves the adsorption of the oily contaminant, whilst allowing the passage of the water component of the condensate.

Within the interior of the filter 14, the glass wool or other fibre filter media (for example the silica-based oleophillic fibres 29) may be packed in the exterior housing 15 to density of from 80 grams per litre to 200 grams per litre; or, in the order of 140 grams per litre (plus or minus 10%). The mass of filter media provides a substantial flow volume made up of the interstitial spaces between the silica-based oleophillic fibres 29 so as not substantially to obstruct liquid flow through the filter media, at least prior to adsorption of a significant quantity of the oily contaminant.

Because the condensate which flows into the main filter chamber 12 tends not to be provided as a constant and sustained fluid flow, even from large scale air compressor(s), i.e. the flow rate of the condensate to the filtration machine 10 tends not to be large, the condensate flowing through the filter 14 does not tend in use, to compact the fibres at least to an extent that liquid flow through the filter is obstructed.

However, in the example of FIGS. 1 to 3, embedded in the silica-based oleophillic fibres 29 (for example glass wool), are polystyrene beads 30. Thus, the silica-based oleophillic fibres 29 support within their mass, the polystyrene beads 30, such polystyrene beads 30 providing an anti-packing function. The polystyrene beads can have a diameter of: from 1 mm to 10 mm; or, from 1.5 mm to 7.5 mm; or, from 2 mm to 6 mm; or, from 3 mm to 5 mm. A non-limiting example of polystyrene beads are the expanded polystyrene beads sold by Springvale EPS Limited having a diameter of from 3 mm to 5 mm.

Whereas such anti-packing material (i.e. the polystyrene beads 30) may take no active part in filtering the condensate, the polystyrene beads 30 assist in preventing the fibres in the filter packing such as to obstruct the flow of liquid through the filter 14, by separating the silica-based oleophillic fibres 29 and maintaining this separation in use.

In the example of FIGS. 1 to 3, the polystyrene beads 30 are entangled in the silica-based oleophillic fibres 29 of the filter media by being mixed in with the silica-based oleophillic fibres 29 before the filter media is packed into the exterior housing 15.

In some examples, glycerine is added to the filter media. Glycerine provides a temporary band (prior to contact with condensate) to ensure the polystyrene beads are blended and stay entangled within the silica-based oleophillic fibres. The polystyrene beads are lighter than other materials within the filter media. Glycerine acts to ensure that there is an equal blend and the lighter materials do not separate out and sit on top of the heavier materials.

Filtration Machine of FIG. 4

In FIG. 4 a modification is illustrated in which the glass wool or other silica-based oleophillic fibres 29 of the filter media, is arranged in discreet layers 29a, 29b, 29c, 29d in the exterior housing 15 in four layers indicated in the example, and between the layers 29a-29d is provided the polystyrene beads 30 interposed between the layers 29a-29d.

Thus the polystyrene beads 30 may be embedded in the fibrous mass of silica-based oleophillic fibres 29, for example as the filter 14 is made.

However, if desired, the particles of the polystyrene beads 30 may be entangled in the silica-based oleophillic fibres 29 and interposed between layers of the fibres.

At least in the example illustrated in FIGS. 1 to 3, the openings in the side wall 15 and the upper and lower end walls 27, 28 of the exterior housing which permit condensate/filtered liquid flow are all smaller or at least not substantially larger than the particles of the polystyrene beads 30, for example the openings may be smaller than 10 mm but preferably are smaller than 4.76 mm. This is to deter the migration of the polystyrene beads 30 from the filter 14 though the openings. However, the polystyrene beads 30 will primarily be retained by being embedded in the silica-based oleophillic fibres 29.

In the FIG. 4 example, it can be seen that at least the lower end housing wall 28 is lined with an inner lining 35 which covers the openings in the lower end wall 28. In the example, the lining 35 is of a felt-like material, and so fluid flow passages in the felt-like material 35 will be very small at least smaller than the openings in the lower end wall 28. This lining 35 will provide a further guard to deter the polystyrene beads 30 being washed from the filter 14 through the openings in the lower end wall 28.

In the generality, the exterior housing 15 of the filter 14, or any part of it, may include over at least a part of its extent, multiple layers, including an outer housing layer 15 with openings, and an inner or outer lining layer such as the felt-like material layer 35, with passages smaller than the openings in the outer housing layer 15.

Figure 5:
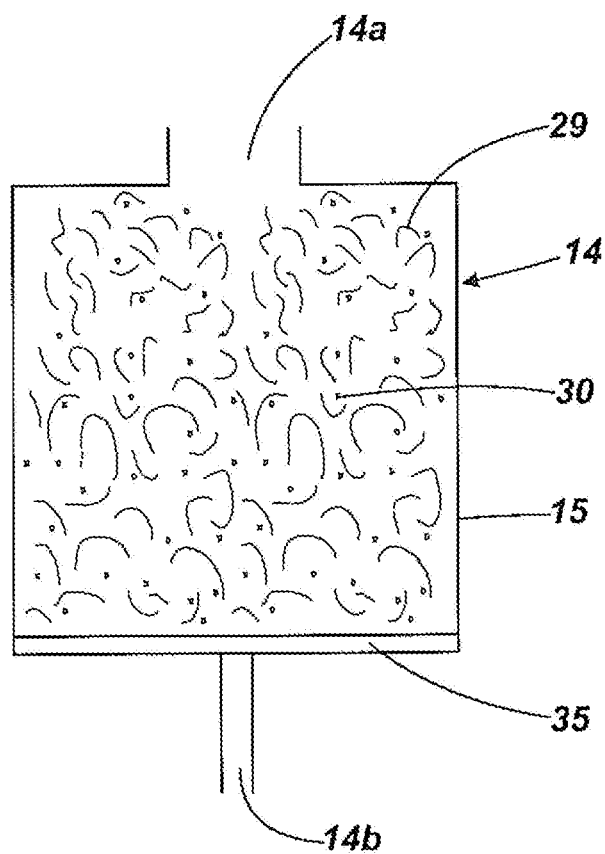
FIG. 5 is an illustrative view of a filter of another example.

Filtration Machine of FIG. 5

In the FIG. 5 example, the filter 14 has an exterior housing 15 of rigid or semi-rigid material which is liquid-tight. The filter 14 though has an inlet at one end, indicated at 14a for receiving condensate, and an outlet 14b at an opposite end for filtrate. The filter 14 does not need to be accommodated in a filter chamber as with the previous examples. The filter 14 does not require a seal 19.

Various further modifications may be made without departing from the scope of the invention.

Another filtration machine in accordance with the invention need not have a weir device 18 to collect condensate, but condensate may directly enter the main filter chamber 12 via an inlet 17 where a chamber 12 is provided, or directly into the filter via the inlet 14a as in the FIG. 5 example.

In the FIGS. 1 to 4 examples, the main filter chamber 12 includes at an upper end thereof a lid 38 which when closed as shown, seals the main filter chamber 12. When the lid 38 is removed or otherwise opened, access can be gained to the interior of the main filter chamber 12 to permit of removal and replacement of the filter 14 through the upper end of the main filter chamber 12, when the filter 14 is clogged and/or saturated with oily contaminant. To facilitate this operation, the filter 14 is provided in the example, at the upper end thereof, with a handle 13. In another example the filter 14 could be a floating filter which descends as more and more oily contaminant is adsorbed or absorbed.

The silica-based oleophillic fibres 29 (for example glass wool) are light, even when packed to the density mentioned above, and where the filter housing 15 is light, it can be the case that the filter 14 floats in the filter chamber 12, or at least floats too readily, at least when new. Accordingly, in yet another example, if required, ballast may be included in the filter 14 to ensure that the filter 14 either does not float, or at least floats when new at a desired level in the filter chamber 12.

Even though the silica-based oleophillic fibres 29, for example glass wool fibre, of the filter 14 described is a considerable improvement over other filter media such as polypropylene used in the context of filtering condensate from air compressors, particularly when the filter 14 is new and is first exposed to the condensate, the filter 14 may not be as efficient at filtering as it may become in due time as the filter media is wetted.

In another example of the FIGS. 1 to 4 examples, a secondary filter chamber 20 may not be provided, or at least such a secondary filter chamber with a Carbon filter 21 need not be provided, but some other means of further filtered liquid treatment may be provided for, within or externally of the filtration machine 10, to enable the filtered liquid to be cleansed to such an extent that it may be released to the environment. Where a second filter is provided this may be of the same kind as the filter 14 according to the invention.

In another example, the main filter chamber 12 need not be cylindrical but may be of another configuration. In this case the filter 14 may need to be correspondingly configured.

In another example, in addition to silica-based fibres, and polystyrene beads, the filter media may include other constituents, such as other fibres which may or may not be oleophillic, to improve filtering efficiency.

Figure 6:
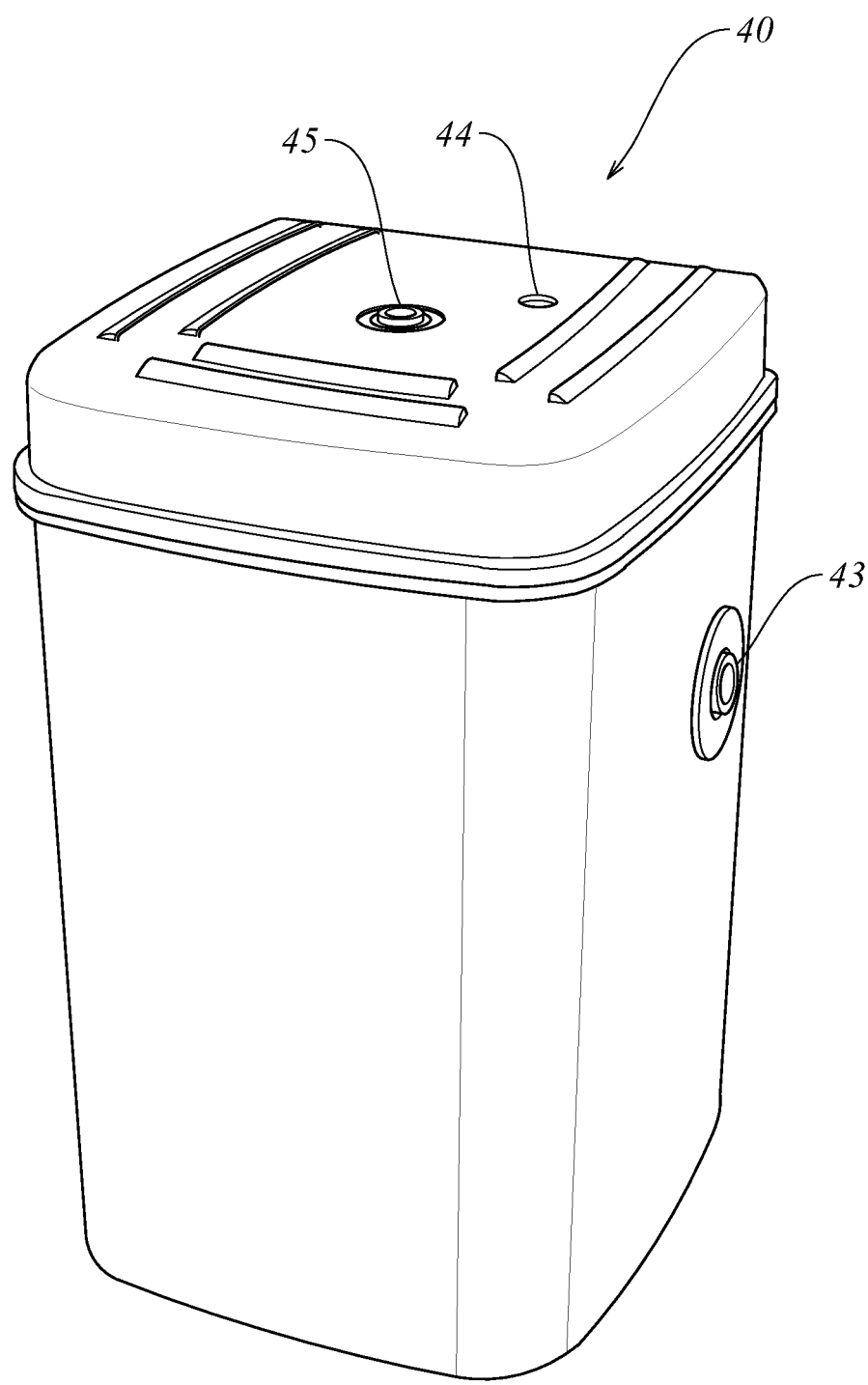
FIG. 6 is an illustrative view of an alternative filtration machine in accordance with one aspect of the invention.
Figure 7:
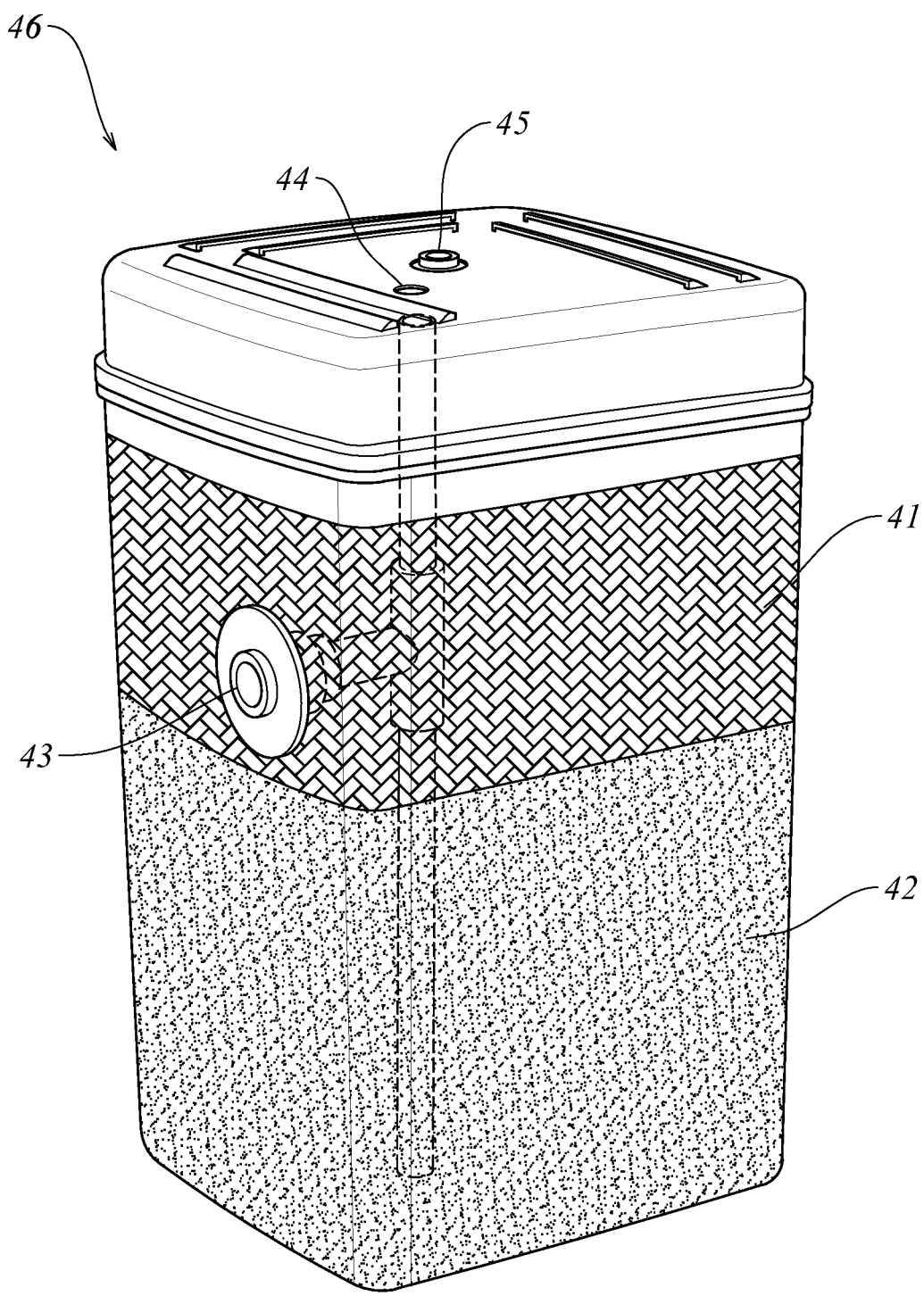
FIG. 7 is an illustrative sectional view of the filter within the filtration machine of FIG. 6.

Filtration Machine of FIGS. 6 and 7

FIG. 6 shows a filtration machine similar to a SEP 60 ST as presently sold by Bowman Stor Ltd.

Referring to FIGS. 6 and 7 of the figures, a filtration machine 40 has a main filter chamber (not shown) in which a filter 46 is provided. The filter 46 includes an external housing which fits within the filtration machine 40.

The filter 46 further includes an inlet 45 through which condensate to be filtered enters the filter 46. Condensate which enters the filter 46 through the inlet 45 passes through the filter 46 where it is filtered, and then exits through the outlet 43.

As can be seen in FIG. 7, the filter 46 includes a de-pressurising void 41 filled with a loose mix of polypropylene fibres. The polypropylene fibres pack down and retain the filter media 42. Additionally, the polypropylene fibres act to remove any larger oil particles and other debris. The condensate passes through the de-pressurising void 41 and into the filter media 42. The filter media 42 adsorbs and/or absorbs oil from the condensate. The filtered condensate then passes out of the filter 46 through the outlet port 43 (via the outlet pipe shown in FIG. 7).

Within the filter 46 there is provided filter media 42, which according to the invention includes a mass of silica-based oleophillic fibres and polystyrene beads. In the examples shown in FIGS. 6 and 7, the silica-based oleophillic fibres are short glass fibres, for example the fibres are predominantly 20 mm or less in length. The silica-based oleophillic fibres are fine, having a diameter in the range of from 1 to 10 µm; or, from 2 to 5 µm; or, from 5.0 µm to 10 µm; or, from 5.0 µm to 8 µm; or, from 5.0 µm to 5.5 µm, as required. The silica-based oleophilic fibres may be a plurality of silicate fibres with a pack density of: from 100 to 220 g/l; or, from 150 to 210 g/l; or, from 170 to 200 g/l. Such fibres when massed (for example pressed together) provide a glass wool.

The fibres of the glass wool mass exhibit a particular affinity for oil, and thus as the condensate contacts, for example passes though, the filter media 42, predominantly the oily contaminant is adsorbed and/or absorbed by the fibres, and the water component passes through the outlet port 43.

The filter 46 includes an anti-syphon vent 44 to permit release of pressure and ensure the smooth flow of condensate through the filter 46 and out through the outlet port 43.

Using such short silica-based fibres of this diameter, particularly efficient filtering of the condensate can be achieved as the fibres collectively present a large surface area to the condensate. However, instead of glass wool, any other silica-based fibres which exhibit oleophillic properties may be massed, but silica-based fibres provided as a wool provides a particularly effective solution, and economically.

To improve filtering efficiency, the glass wool fibres may be pre-treated with a wetting agent such as a detergent or other surfactant, which it has been found improves the adsorption of the oily contaminant, whilst allowing the passage of the water component of the condensate.

Within the interior of the filter 46, the filter media 42 may be packed in the filter 46 to a density of from 80 grams per litre to 200 grams per litre; or, in the order of 140 grams per litre (plus or minus 10%); or, in the order of 175 grams per litre (plus or minus 10%). The mass of filter media provides a substantial flow volume made up of the interstitial spaces between the fibres so as not substantially to obstruct liquid flow through the filter media, at least prior to adsorption of a significant quantity of the oily contaminant.

Because the condensate which flows into the filter 46 tends not to be provided as a constant and sustained fluid flow, even from large scale air compressor(s), i.e. the flow rate of the condensate to the filtration machine 40 tends not to be large, the condensate flowing through the filter 46 does not tend in use, to compact the fibres at least to an extent that liquid flow through the filter is obstructed.

In the example of FIGS. 6 and 7, embedded in the glass wool filter media (within the filter media 42), are polystyrene beads. Thus, the fibres support within their mass the polystyrene beads; the polystyrene beads providing an anti-packing function. The polystyrene beads can have a diameter of: from 1 mm to 10 mm; or, from 1.5 mm to 7.5 mm; or, from 2 mm to 6 mm; or, from 3 mm to 5 mm. A non-limiting example of polystyrene beads are the expanded polystyrene beads sold by Springvale EPS Limited having a diameter of from 3 mm to 5 mm.

Whereas such anti-packing material (i.e. the polystyrene beads) may take no active part in filtering the condensate, the polystyrene beads assist in preventing the fibres in the filter packing such as to obstruct the flow of liquid through the filter 46, by separating the fibres and maintaining this separation in use.

In the example of FIGS. 6 and 7, the polystyrene beads are entangled in the fibres of the filter media by being mixed in with the fibres before the filter media is packed into the filter 46.

In some examples, glycerine is added to the filter media. Glycerine provides a temporary band (prior to contact with condensate) to ensure the polystyrene beads are blended and stay entangled within the silica-based oleophillic fibres. The polystyrene beads are lighter than other materials within the filter media. Glycerine acts to ensure that there is an equal blend and the lighter materials do not separate out and sit on top of the heavier materials.

Laboratory Tests

Five SEP 60 ST filter machines, as presently sold by Bowman Stor Ltd., were modified to test different filter media. With reference to FIG. 7, the filter media 42 was changed in these five examples. Additionally, a standard SEP 60 ST (which uses Media 2 from Table 1) was used as a comparison.

Tests were undertaken at Bowman Stor Ltd.'s on-site laboratory (under confidential conditions) to examine the benefit of using a polystyrene bead blended filter media versus a Perlite blended filter media.

A 200 ppm manufactured condensate effluent was first formed. Tests were undertaken to measure the time taken to pass a condensate through a filter (with a given filter media) and then how much condensate passed through the same filter bed over a time period of 4 hours.

Method

A manufactured condensate effluent containing 200 ppm of used compressor oil was formed by pumping tap water through an in-line shear mixing pump (a Silverson 150 L in this non-limiting example) at 1.2 L/H (i.e. the tap water was dosed with oil at 2.4 mL/H). This mixed the oil into the water to form a manufactured (air compressor) condensate effluent.

Identical SEP 60 ST filtration machines were used for each filter media blend. The filter media (filter media 42 in FIG. 7) was filled with different blends of filter media at the same total volume of 2.6 Litres.

The SEP 60 ST uses a Perlite blended filter media as standard (namely, Media 2 listed in Table 1 below). In these tests, the six different filter media blends were filled into the bottom section (filter media 42 in FIG. 7) of the filter, the top section (de-pressurising void 41 in FIG. 7) was filled with polypropylene shred (which is an industrial standard of from 80 mm to 125 mm, by 4 mm strips). In each case the only difference was the filter media making up the 2.6 Litres (filter media 42 in FIG. 7).

TABLE 1

Filter Media Blends

| Component/Wt % | Media 1 | Media 2 | Media 3 | Media 4 | Media 5 | Media 6 |
|---|---|---|---|---|---|---|
| Silicate Fibres | 96.7 | 48.0 | 76.4 | 76.4 | 75.3 | 75.3 |
| Polypropylene Fibres | 3.3 | 1.6 | 2.6 | 2.6 | 2.6 | 2.6 |
| Perlite | Nil | 34.0 | Nil | 1.4 | 2.5 | Nil |
| Water | Nil | 9.8 | 10.9 | 10.9 | 10.9 | 10.9 |
| Glycerine | Nil | 6.6 | 8.7 | 8.7 | 8.7 | 8.7 |
| Polystyrene Beads | Nil | Nil | 1.4 | Nil | Nil | 2.5 |

The components listed above were sourced as follows:
Silicate fibres (sodium silicate fibres): SUPAFIL 40 glass blowing mineral wool as sold by Knauf Insulation (EU index number 650-016-00-2).
Polypropylene fibres: FYBA 0001, a non-woven mat of randomly oriented fibers of polypropylene having diameters of from 4 to 10 μm, as sold by Fybagrate.
Perlite: expanded Perlite sold by RS Minerals Ltd.
Water: tap water.
Glycerine: glycerine sold by Monarch Chemical Ltd.
Polystyrene beads: expanded polystyrene beads having a diameter of from 3 mm to 5 mm sold by Springvale EPS Ltd.

The packed density of the Media in each case was: Media 1 173 g/l; Media 2 200 g/l; Media 3 200 g/l; Media 4 180 g/l; Media 5 180 g/l; Media 6 170 g/l.

For each media tested, the amount of each component present is given in weight %, within the 2.6 Litres of media used for each test.

TABLE 2

Pass Time and 4 Hour Flow Rate Results

| | Media 1 | Media 2 | Media 3 | Media 4 | Media 5 | Media 6 |
|---|---|---|---|---|---|---|
| Pass Time | 1.22.56 Hours | 1.17.01 Hours | 1.19.48 Hours | 1.30.16 Hours | 1.22.20 Hours | 0.53.11 Hours |
| 4 Hour Flow Rate | 2.5 Litres | 3.2 Litres | 3.1 Litres | 2.8 Litres | 2.9 Litres | 3.35 Litres |

To calculate the pass time (as given in Table 2), the manufactured condensate effluent containing 200 ppm of used compressor oil was passed through the filter at a flow rate of 1.2 litres per hour, at a pressure of 2.5 bar and at 20° C. Each filter media has a different dwell time due to the components of the media being different. The filters were filled from the top, so the manufactured condensate passed through the entire filter and then to the outlet. For this to happen, the whole section of the filter media below the outlet (2.6 Litres) had to become saturated. The lower the pass time, the faster the manufactured condensate passed through the media.

After recording the pass time, the manufactured condensate was passed through the filter for a further 4 hours. The 4 hour flow rate in Table 2 shows the volume of filtered condensate which passed through the filters after four hours. The higher the 4 hour flow rate, the more efficient the filter was over that 4 hour time period in permitting the condensate to flow.

The filtered condensate, which had passed through the media in each case, was generally free of oil contamination. In other words, all media adsorbed and/or absorbed the oil and gave generally pure water, as a result of filtration.

CONCLUSIONS

Media 1 did not permit the condensate to establish a substantial flow through (it gave the lowest 4 hour flow rate). This was expected because Media 1 included no anti-packing material.

Media 2 had a better 4 hour flow rate than Media 1, and permitted more condensate to pass through the filter over the time period.

Media 3 had a quicker passage through the media than Media 1 but did not allow the same flow as Media 2. This was also shown by the comparative 4-hour flow rates. However, Media 2 had a substantially higher proportion of anti-packing material (34.0 weight % Perlite in Media 2 versus 1.4 weight % polystyrene beads in Media 3). Media 3 provided more silicate fibres for the same volume (compared to Media 2). This proportionally higher amount of silicate fibres in Media 3 provided more relative surface area of silicate fibres for adsorption and/or absorption of oily contaminant. Therefore, Media 3 will have a longer length of life than Media 2 (before the media has to be replenished or replaced).

Media 4 and Media 3 are comparable in that Media 4 has the same relative amount of Perlite as Media 3 has polystyrene beads. Media 3 surprisingly provided a faster pass time and a greater 4 hour flow rate than Media 4.

Media 5 and Media 6 are comparable in that Media 5 has the same relative amount of Perlite as Media 6 has polystyrene beads. Media 6 surprisingly provided a faster pass time and a greater 4 hour flow rate than Media 5.

The comparative test results show that using an anti-packing material in the filters aids the flow of condensate through the filter media.

Comparing Perlite blended media with the same percentage blend of polystyrene bead blended media (Media 3 versus Media 4; and, Media 5 versus Media 6) shows that polystyrene beads provide a better pass time and flow rate over 4 hours.

The inclusion of polystyrene beads as an anti-packing material surprisingly led to faster pass time and a greater flow rate over 4 hours, without any loss of filtering efficiency. Therefore, the inclusion of polystyrene beads in the filter media of the present invention surprisingly provides an improvement over at least the inclusion of Perlite as an anti-packing material.

The present inventors found that the anti-packing effect of the polystyrene beads reduced to a negligible amount when the amount of polystyrene beads present in the media was less than 0.5% by weight.

The present inventors found that increasing the amount of polystyrene beads present in the media to greater than 5.0% by weight reduced the filtering capability of the media.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying figures, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

I claim:

1. Filter media for filtering condensate which includes water and oily contaminant, the filter media comprising:
    silica-based oleophilic fibres, and,
    an anti-packing material, wherein the anti-packing material is polystyrene beads at from 0.5% by weight to 5.0% by weight.

2. The filter media of claim 1, wherein the polystyrene beads are present at from 1.0% by weight to 3.0% by weight.

3. The filter media of claim 1, wherein the silica-based oleophilic fibres are glass wool fibres and/or silicate fibres and/or sodium silicate fibres.

4. The filter media of claim 1, wherein:
    the polystyrene beads are entangled in the fibres; or,
    the polystyrene beads are in one, two, three, four or five separate layers, between two, three, four, five or six separate layers of the fibres.

5. The filter media of claim 1, wherein the polystyrene beads are spherical and have a diameter of from 1 mm to 10 mm.

6. The filter media of claim 5, wherein the polystyrene beads have a diameter of from 3 mm to 5 mm.

7. The filter media of claim 1, wherein the silica-based oleophilic fibres are silicate fibres and/or sodium silicate fibres with a diameter of from 1 to 10 µm.

8. The filter media of claim 7, wherein the silicate fibres and/or sodium silicate fibres have a diameter of from 2 to 5 µm.

9. The filter media of claim 1, wherein the filter media has a packed density of from 100 to 220 g/l.

10. The filter media of claim 9, wherein the filter media has a packed density of: from 150 to 210 g/l; or, from 170 to 200 g/l.

11. The filter media of claim 1, wherein the filter media further comprises one, two, three or all of:
    Polypropylene fibres;
    Perlite;
    Water; and/or,
    Glycerine.

12. The filter media of claim 1, wherein the filter media comprises:
    silica-based oleophilic fibres (optionally, glass wool fibres and/or silicate fibres and/or sodium silicate fibres) at from 70% by weight to 80% by weight, and
    polystyrene beads at from 0.5% by weight to 5.0% by weight, the balance being one, two or three of polypropylene fibres, water and/or glycerine.

13. The filter media of claim 1, wherein the filter media comprises:
    silica-based olcophilic fibres (optionally, glass wool fibres and/or silicate fibres and/or sodium silicate fibres) at from 70% by weight to 80% by weight,
    polystyrene beads at from 0.5% by weight to 5.0% by weight,
    polypropylene fibres at from 2.0% by weight to 4.0% by weight,
    water at from 1.0% by weight to 20.5% by weight, and,
    glycerine at from 7.0% by weight to 10.0% by weight;
    optionally, the filter media further comprising unavoidable impurities.

14. The filter media of claim 1, wherein the filter media comprises:
    silica-based oleophilic fibres (optionally, glass wool fibres and/or silicate fibres and/or sodium silicate fibres) at from 73% by weight to 78% by weight,
    polystyrene beads at from 1.0% by weight to 3.0% by weight,
    polypropylene fibres at from 2.0% by weight to 3.0% by weight,
    water at from 7.0% by weight to 16.0% by weight, and,
    glycerine at from 8.0% by weight to 9.0% by weight;
    optionally, the filter media further comprising unavoidable impurities.

15. A filter comprising the filter media of claim 1.

16. A filtration machine comprising the filter media of claim 1 and/or a filter comprising the filter media of claim 1.

17. A method of removing oil from a condensate which includes water and oily contaminant, the method comprising:
    passing the condensate through the filter media of claim 1; or, through a filter comprising the filter media of claim 1, or through a filtration machine comprising the filter media of claim 1.

18. The method of claim 17, wherein the condensate comprises water and oil, the oil present in the condensate at: from 20 ppm to 2,000 ppm; or, from 50 ppm to 1,000 ppm; or, from 100 ppm to 500 ppm; or, from 150 ppm to 250 ppm.

\* \* \* \* \*